(12) United States Patent
Ma et al.

(10) Patent No.: US 12,579,289 B2
(45) Date of Patent: Mar. 17, 2026

(54) MULTIMEDIA SHARING METHOD AND APPARATUS, AND DEVICE AND MEDIUM

(71) Applicant: Beijing Zitiao Network Technology Co., Ltd., Haidan District (CN)

(72) Inventors: Xinya Ma, Beijing (CN); Xia Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/909,087

(22) Filed: Oct. 8, 2024

(65) Prior Publication Data

US 2025/0068752 A1      Feb. 27, 2025

Related U.S. Application Data

(63) Continuation of application No. PCT/CN2023/088168, filed on Apr. 13, 2023.

(30) Foreign Application Priority Data

Apr. 24, 2022      (CN) .......................... 202210435218.4

(51) Int. Cl.
| | |
|---|---|
| *G06F 21/62* | (2013.01) |
| *G06F 21/31* | (2013.01) |
| *H04L 67/55* | (2022.01) |

(52) U.S. Cl.
CPC .......... *G06F 21/6209* (2013.01); *G06F 21/31* (2013.01); *H04L 67/55* (2022.05)

(58) Field of Classification Search
CPC ....... G06F 21/6209; G06F 21/31; H04L 67/55
See application file for complete search history.

(56) References Cited

U.S. PATENT DOCUMENTS

| | | | |
|---|---|---|---|
| 8,972,869 B1 * | 3/2015 | Willis ..................... H04L 51/08 |
| | | | 715/753 |
| 9,747,459 B2 * | 8/2017 | Faitelson .............. G06F 21/604 |

(Continued)

FOREIGN PATENT DOCUMENTS

| | | |
|---|---|---|
| AU | 2020210234 B2 | 8/2020 |
| CN | 102325182 A | 1/2012 |

(Continued)

OTHER PUBLICATIONS

SA China National Intellectual Property Administration, International Search Report Issued in Application No. PCT/CN2023/088168, Jun. 25, 2023, 7 pages.

(Continued)

*Primary Examiner* — James R Turchen
(74) *Attorney, Agent, or Firm* — Alleman Hall LLP

(57) ABSTRACT

The embodiments of the present disclosure relate to a multimedia sharing method and apparatus, and a device and a medium, wherein the method is applied to a server. The method comprises: receiving a recording end instruction for a target multimedia, wherein the target multimedia is used for recording a target process; determining identity information of at least one user who participates in the target process; and according to the identity information, pushing a sharing notification, which comprises a permission control, to a client of the at least one user, so that the at least one user grants or applies for an access permission of the target multimedia on the basis of the permission control, wherein different pieces of identity information correspond to different permission controls.

13 Claims, 6 Drawing Sheets

```
                                    ⌐ 400
 ╭─────────────────────────────────────────╮
 │  conference recording completed          │
 │                                          │
 │    theme: Xiao A's video conference      │
 │                                          │
 │    owner: Xiao A                         │
 │    time: 20**-**-** 18: 32: 19           │
 │                                          │
 │    recoding file: Xiao A's video conference
 │                                   ⌐ 401  │
 │                                          │
 │   ╭──────────────────────────────╮       │
 │   │   apply for access permission │      │
 │   ╰──────────────────────────────╯       │
 ╰─────────────────────────────────────────╯
```

(56)                References Cited

U.S. PATENT DOCUMENTS

| | | | | |
|---|---|---|---|---|
| 11,128,483 | B1 * | 9/2021 | Surazski | G06V 20/30 |
| 11,681,819 | B1 * | 6/2023 | Surazski | G06F 16/9535 726/28 |
| 11,710,509 | B1 * | 7/2023 | Bhupati | H04L 65/403 386/282 |
| 2010/0158232 | A1 * | 6/2010 | Sylvain | H04L 65/4038 379/202.01 |
| 2013/0145284 | A1 * | 6/2013 | Anantharaman | G06F 21/10 715/753 |
| 2014/0152757 | A1 * | 6/2014 | Malegaonkar | H04L 67/535 348/14.01 |
| 2014/0351335 | A1 | 11/2014 | Huerou et al. | |
| 2014/0351952 | A1 * | 11/2014 | Gopu | G06F 21/105 726/27 |
| 2016/0269449 | A1 * | 9/2016 | Modai | H04L 65/4038 |
| 2017/0118271 | A1 | 4/2017 | Reyes | |
| 2017/0200122 | A1 * | 7/2017 | Edson | H04L 63/104 |
| 2019/0236547 | A1 * | 8/2019 | Huang | H04L 65/4015 |
| 2022/0247732 | A1 * | 8/2022 | Krohn | H04L 9/14 |
| 2022/0368733 | A1 | 11/2022 | Lu | |
| 2023/0155850 | A1 * | 5/2023 | Yalawarmath | H04M 3/42221 709/204 |
| 2023/0281883 | A1 * | 9/2023 | Chan | G06T 11/00 345/634 |
| 2024/0096374 | A1 * | 3/2024 | Agrawal | H04N 7/155 |
| 2024/0427920 | A1 * | 12/2024 | Rajani | G06F 13/382 |

FOREIGN PATENT DOCUMENTS

| | | |
|---|---|---|
| CN | 110381382 A | 10/2019 |
| CN | 109287116 A | 8/2020 |
| CN | 111680328 A | 9/2020 |
| CN | 112311754 A | 2/2021 |
| CN | 112769856 A | 5/2021 |
| CN | 113938724 A | 1/2022 |

OTHER PUBLICATIONS

European Patent Office, Extended European Search Report Issued in Application No. 23795054.8, May 16, 2025, Germany, 10 pages.

* cited by examiner

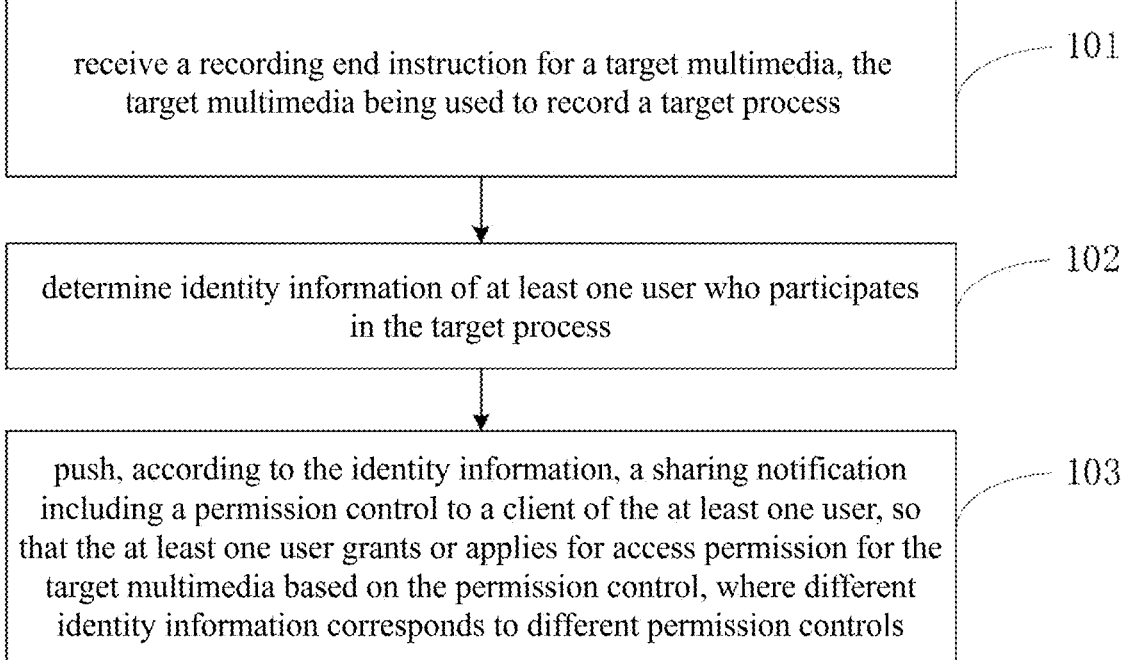

receive a recording end instruction for a target multimedia, the target multimedia being used to record a target process — 101 determine identity information of at least one user who participates in the target process — 102 push, according to the identity information, a sharing notification including a permission control to a client of the at least one user, so that the at least one user grants or applies for access permission for the target multimedia based on the permission control, where different identity information corresponds to different permission controls — 103

FIG. 1 acquire schedule information of the target process — 301 determine identity information of the at least one user according to the schedule information — 302

— 400 conference recording completed theme: Xiao A's video conference owner: Xiao A time: 20--** 18: 32: 19 recoding file: Xiao A's video conference
— 401 apply for access permission

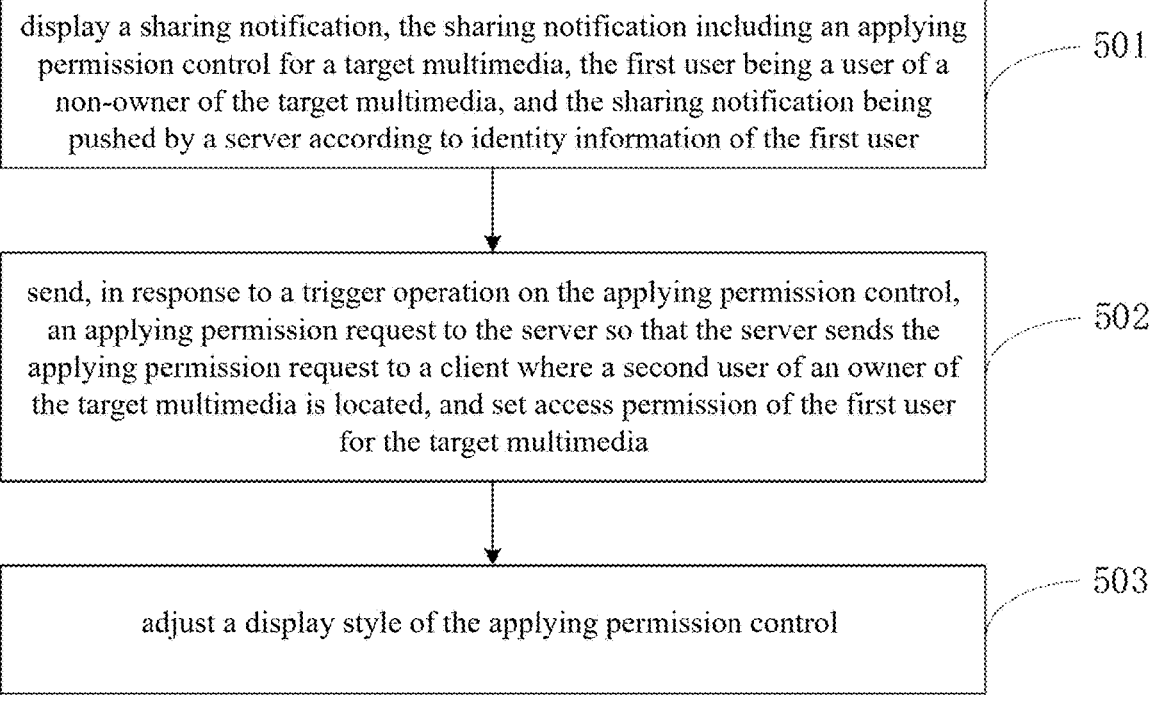

display a sharing notification, the sharing notification including an applying
permission control for a target multimedia, the first user being a user of a
non-owner of the target multimedia, and the sharing notification being
pushed by a server according to identity information of the first user
— 501 send, in response to a trigger operation on the applying permission control,
an applying permission request to the server so that the server sends the
applying permission request to a client where a second user of an owner of
the target multimedia is located, and set access permission of the first user
for the target multimedia
— 502 adjust a display style of the applying permission control
— 503

FIG. 5

— 600 permission granted

@Xiao A has granted access permission for a
recording file Xiao A's video conference for you

FIG. 6

MULTIMEDIA SHARING METHOD AND APPARATUS, AND DEVICE AND MEDIUM

CROSS-REFERENCING OF RELEVANT APPLICATIONS

The present application is based on and claims the priority of the PCT application No. PCT/CN2023/088168 filed on Apr. 13, 2023 and the Chinese patent application No. 202210435218.4 filed on Apr. 24, 2022, entitled "Multimedia Sharing Method and Apparatus, and Device and Medium". The entire contents of these applications are hereby incorporated by reference into the present application.

TECHNICAL FIELD

The present disclosure relates to the technical field of computers, and in particular, to a multimedia sharing method and apparatus, and a device and a medium.

BACKGROUND

With the continuous development of Internet technology, multimedia recording is increasingly being used in daily and office life due to its outstanding performance in information retention and other aspects.

SUMMARY

In order to solve the technical problems in the related art, the present disclosure provides a multimedia sharing method and apparatus, and a device and a medium.

An embodiment of the present disclosure provides a multimedia sharing method, which is applied to a server and includes:

receiving a recording end instruction for a target multimedia, the target multimedia being used to record a target process;

determining identity information of at least one user who participates in the target process; and pushing, according to the identity information, a sharing notification including a permission control to a client of the at least one user, so that the at least one user grants or applies for access permission for the target multimedia based on the permission control, where different identity information corresponds to different permission controls.

An embodiment of the present disclosure also provides a multimedia sharing method, which is applied to a client of a first user and includes:

displaying a sharing notification, the sharing notification including an applying permission control for a target multimedia, the first user being a user of a non-owner of the target multimedia, and the sharing notification being pushed by a server according to identity information of the first user;

sending, in response to a trigger operation on the applying permission control, an applying permission request to the server so that the server sends the applying permission request to a client of a second user corresponding to an owner of the target multimedia, and setting access permission of the first user for the target multimedia; and adjusting a display style of the applying permission control.

An embodiment of the present disclosure also provides a multimedia sharing apparatus, which is provided on a server and includes:

an instruction module, used for receiving a recording end instruction for a target multimedia, the target multimedia being used to record a target process;

an identity module, used for determining identity information of at least one user who participates in the target process; and a notification pushing module, used for pushing, according to the identity information, a sharing notification including a permission control to a client of the at least one user, so that the at least one user grants or applies for access permission for the target multimedia based on the permission control, where different identity information corresponds to different permission controls.

An embodiment of the present disclosure also provides a multimedia sharing apparatus, which is provided on a client of a first user and includes:

a notification display module, used for displaying a sharing notification, the sharing notification including an applying permission control for a target multimedia, the first user being a user of a non-owner of the target multimedia, and the sharing notification being pushed by a server according to identity information of the first user;

an application module, used for sending, in response to a trigger operation on the applying permission control, an applying permission request to the server so that the server sends the applying permission request to a client of a second user of an owner of the target multimedia, and setting access permission of the first user for the target multimedia; and a style adjustment module, used for adjusting a display style of the applying permission control.

An embodiment of the present disclosure also provides an electronic device, including: a processor; and a memory used for storing instructions executable by the processor; the processor being used for reading the executable instructions from the memory and executing the instructions to implement the multimedia sharing method provided in an embodiment of the present disclosure.

An embodiment of the present disclosure also provides a computer-readable storage medium, the storage medium storing a computer program, which is used for executing the multimedia sharing method provided in an embodiment of the present disclosure.

BRIEF DESCRIPTION OF THE DRAWINGS

The above and other features, advantages and aspects of various embodiments of the present disclosure will become more apparent with reference to the following detailed implementations in conjunction with the accompanying drawings. Throughout the accompanying drawings, the same or similar reference numerals refer to the same or similar elements. It should be understood that the accompanying drawings are schematic and that objects and elements are not necessarily drawn to scale.

FIG. 1 is a flow diagram of a multimedia sharing method provided in an embodiment of the present disclosure;

FIG. 5 is a flow diagram of yet another multimedia sharing method provided in an embodiment of the present disclosure;

FIG. 6 is a schematic diagram of first notification information provided in an embodiment of the present disclosure;

DETAILED DESCRIPTION

Figure 2:
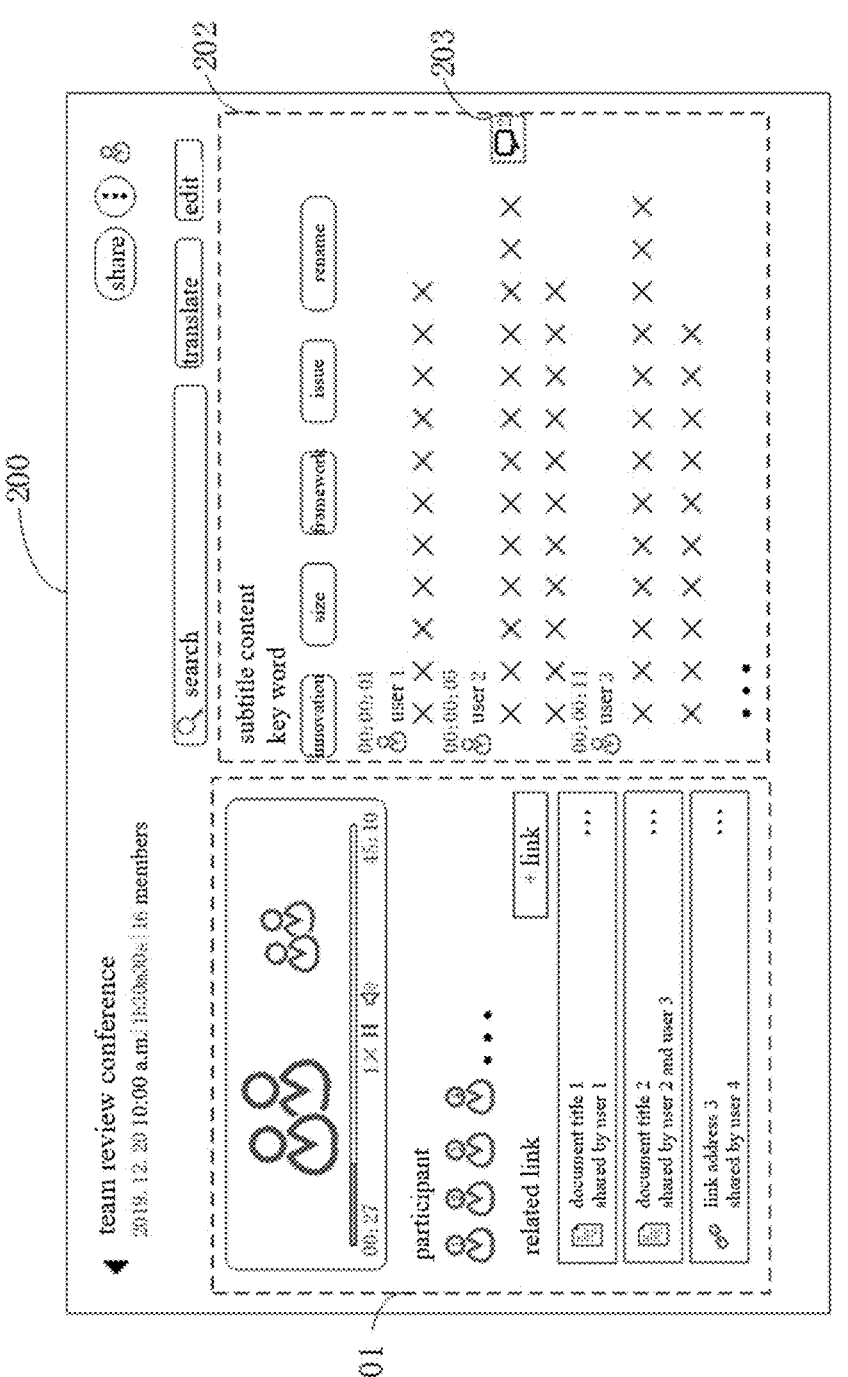
FIG. 2 is a schematic diagram of the presentation of a target multimedia provided in an embodiment of the present disclosure.

Embodiments of the present disclosure will be described in more detail below with reference to the accompanying drawings. Although certain embodiments of the present disclosure are shown in the accompanying drawings, it should be understood that the present disclosure can be implemented in various forms and should not be construed as limited to the embodiments set forth herein. Instead, these embodiments are provided to bring a more thorough and complete understanding of the present disclosure. It should be understood that the accompanying drawings and embodiments of the present disclosure are only used for illustrative purposes and are not used to limit the scope of protection of the present disclosure.

It should be understood that the various steps described in the method implementations of the present disclosure may be executed in different orders and/or in parallel. Furthermore, method implementations may include additional steps and/or omit performing illustrated steps. The scope of the present disclosure is not limited in this regard.

The term "include" and variations thereof as used herein are open inclusions, i.e., "including but not limited to". The term "based on" means "based at least in part on". The term "one embodiment" means "at least one embodiment"; the term "another embodiment" means "at least one additional embodiment"; the term "some embodiments" means "at least some embodiments". Relevant definitions of other terms are given in the following description.

It should be noted that the concepts such as "first" and "second" mentioned in the present disclosure are only used to distinguish different apparatuses, modules or units, and are not used to limit the order or interdependence of the functions performed by these apparatuses, modules or units.

It should be noted that the modifications of "one" and "a plurality of" mentioned in the present disclosure are illustrative rather than restrictive, and those skilled in the art should understand that unless otherwise clearly indicated in the context, it should be understood as "one or more".

The names of messages or information exchanged between a plurality of apparatuses in the implementations of the present disclosure are only used for illustrative purposes and are not used to limit the scope of these messages or information.

In some related products, important processes can be recorded to generate multimedia files, such as recording conference processes for review. In the related art, an owner user of a multimedia file can share the recorded multimedia file with other non-owner users who participate in the process. However, it is difficult for the non-owner users to acquire the multimedia file when the owner user does not actively share the multimedia file, that is, this sharing method is difficult and inefficient.

The technical solution provided in the embodiments of the present disclosure has the following advantages over the prior art: in the multimedia sharing solution provided in the embodiments of the present disclosure, a server receives a recording end instruction for a target multimedia, the target multimedia being used to record a target process; determines identity information of at least one user who participates in the target process; and pushes, according to the identity information, a sharing notification including a permission control to a client of the at least one user, so that the at least one user grants or applies for access permission for the target multimedia based on the permission control, where different identity information corresponds to different permission controls. By using the above technical solution, after receiving a recording end instruction of a multimedia, the server can push a sharing notification including different permission controls to each user according to identity information of each user who participates in the process, so that each user can grant or apply for access permission for the multimedia based on the permission controls. Accordingly, not only can an owner user of the multimedia conveniently share the multimedia, but other users can also quickly apply for access permission for the multimedia based on the permission controls even if the owner user of the multimedia does not actively share the multimedia, thereby reducing the difficulty in multimedia sharing, and improving the efficiency of multimedia sharing.

In order to solve the problems existing in multimedia sharing in the related art, an embodiment of the present disclosure provides a multimedia sharing method, which is introduced below in conjunction with specific embodiments.

FIG. 1 is a flow diagram of a multimedia sharing method provided in an embodiment of the present disclosure. The method may be executed by a multimedia sharing apparatus, where the apparatus may be implemented using software and/or hardware and may generally be integrated into an electronic device. As shown in FIG. 1, the method is applied to a server and includes:

Step 101, receive a recording end instruction for a target multimedia, the target multimedia being used to record a target process.

The multimedia sharing method of the embodiment of the present disclosure may be executed by the server.

The target multimedia can be understood as a multimedia file obtained by recording a certain real-time voice interaction process, and the interaction process is the target process. For example, the target process can be an online conference process, and the target multimedia can be a file obtained by recording the online conference process for subsequent review.

In an embodiment of the present disclosure, when the recording of the target multimedia ends, the server may receive a recording end instruction, which may be sent by a client of any user who participates in the target process.

Exemplarily, FIG. 2 is a schematic diagram of the presentation of a target multimedia provided in an embodiment of the present disclosure. As shown in FIG. 2, a multimedia interface 200 used for displaying the recorded target multimedia is shown in the figure. The multimedia display interface 200 may include a first area 201 and a second area 202. The first area 201 may display relevant information of a video of the target multimedia. A top area of the first area

201 displays a picture or video of the target multimedia, and participant information is displayed below the picture or video. FIG. 2 shows the avatar of a participant. A bottom area of the first area 201 displays three related links, each of which includes a title and a link source. For example, the first related link is a document titled "Document 1" and shared by a user 1, and the current user can also click the link adding button on the right to add more related links according to the actual situation. The second area 202 can display subtitle content of the target multimedia and extracted keywords. There are 5 keywords shown in the figure, namely "innovation", "size", "framework", "component" and "rename". When the user triggers one of the keywords, the keyword can be highlighted. The second area 202 can also display a subtitle interaction aggregation logo 203 used for displaying subtitle interaction content. When the subtitle interaction aggregation logo 203 is triggered, the corresponding subtitle interaction content including comments, emoticons, etc. can be displayed.

In FIG. 2, the title "Team Review Conference" of the target multimedia and other related content are also displayed in the top area of the multimedia display interface 200. In the figure, "2019.12.20 10:00 am" indicates the start time of the target multimedia, "1 h30 m30 s" indicates the duration of the target multimedia is 1 hour, 30 minutes and 20 seconds, and "16" indicates the number of participants. In addition, a search control, a translation control, an editing control, and a sharing control are also displayed. When the user triggers corresponding controls, corresponding operations can be performed. It is understandable that the display method of the target multimedia after recording in FIG. 2 is only an example and not a limitation.

Step 102, determine identity information of at least one user who participates in the target process.

In some application scenarios, the target multimedia is recorded in the cloud, that is, in these application scenarios, the target multimedia is stored in a cloud space of a user with ownership, and the determination of the ownership of the target multimedia is related to the identity information of the user who participates in the target process, so that it is necessary to determine the identity information of the user who participates in the target process. The identity information may be a representation of the role of the user when participating in the target process, and the user's ownership or property rights over the target multimedia may be reflected through the identity information. In an embodiment of the present disclosure, identity information may include an owner and a non-owner of the target multimedia. The owner represents the ownership of a certain object. For example, if a user is the owner of a multimedia, the user has all permissions for the target multimedia; and if a user is the non-owner of a multimedia, the user does not have any permissions for the target multimedia.

Figures 3, 4:
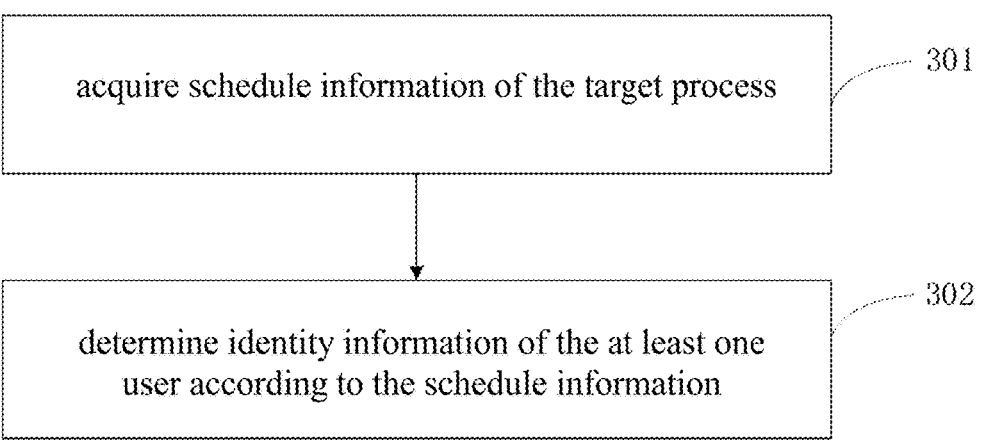
FIG. 3 is a flow diagram of another multimedia sharing method provided in an embodiment of the present disclosure.
FIG. 4 is a schematic diagram of a sharing notification provided in an embodiment of the present disclosure.

Exemplarily, FIG. 3 is a flow diagram of another multimedia sharing method provided in an embodiment of the present disclosure. In a feasible implementation, the determining identity information of at least one user who participates in the target process may include the following steps:

Step 301, acquire schedule information of the target process.

The schedule information may be used to record a start time, an end time, participating users, a theme, a location and other related information of the target process. For example, when the target process is a conference process, the schedule information may include an expected start time and an expected end time of the conference, a conference theme, participating users, a conference location and other information.

Step 302, determine identity information of the at least one user according to the schedule information.

The at least one user may include users who participate in the target process, that is, a user who initiates an invitation of the target process and a user who actually participates among the invited users.

In some embodiments, the determining identity information of the at least one user according to the schedule information may include: determining a process organizing user and a process initiating user of the target process, as well as a recording initiating user of the target multimedia according to the schedule information; determining the identity information of a target user among the process organizing user, the process initiating user and the recording initiating user as the owner according to a preset priority strategy; and determining the identity information of other users among the at least one user except the target user as the non-owner.

The process organizing user may be a user who organizes the above target process, and the specific execution time, location and other related information of the above target process are determined by the process organizing user. The process initiating user may be a user who actively initiates or starts the target process, and can be the same user as or a different user from the above process organizing user. The process initiating user can be regarded as a host of the target process. For example, when the target process is a conference process, the process initiating user can be a conference host. The recording initiating user may be a user who initiates or requests the recording of the target multimedia during the target process, and the recording request may be agreed to by the above process initiating user. The target user may be a user who has ownership of the target multimedia and is determined according to a preset priority strategy. The preset priority strategy may be a strategy determined for an ownership user of the target multimedia.

Specifically, after acquiring the schedule information of the target process, the server can determine a process organizing user and a process initiating user of the target process of the target multimedia, as well as a recording initiating user of the target multimedia according to the schedule information. Then, according to a preset priority strategy, when the above process organizing user exists, the process organizing user is determined as the target user; when no process organizing user exists and the number of users who participate in the target process is greater than two, the process initiating user can be determined as the target user; when no process organizing user exists and the number of users who participate in the target process is two, the recording initiating user can be determined as the target user, and the identity information of the target user is determined as the owner, that is, the target user has the ownership of the target multimedia, and the identity information of other users among the above at least one user except the target user is determined as the non-owner.

The server can also determine the identity information of each user who participates in the target process in other ways. For example, the identity information can be determined based on speech content of each user in the target multimedia, which is only an example.

In the above solution, the identity information of each user who participates in the target process can be quickly and accurately determined based on the schedule information, thereby improving the efficiency of subsequent processing.

Step 103, push, according to the identity information, a sharing notification including a permission control to a client of the at least one user, so that the at least one user grants or applies for access permission for the target multimedia based on the permission control, where different identity information corresponds to different permission controls.

The permission control may be a functional control used to perform specific operations on the access permission for the target multimedia. In an embodiment of the present disclosure, the permission control may include a granting permission control and an applying permission control. The granting permission control is used to authorize the access permission for the target multimedia, and the applying permission control is used to apply for the access permission for the target multimedia. The access permission of the target multimedia may include at least one of an editing permission, a browsing permission, a sharing permission, etc. The sharing notification may be a notification used to carry the permission control and remind the user to share the target multimedia.

In some embodiments, if the identity information is the non-owner for the target multimedia, the permission control is the applying permission control. The pushing, according to the identity information, a sharing notification including a permission control to a client of the at least one user may include: pushing a sharing notification including the applying permission control to a client of a first user corresponding to the non-owner.

In some embodiments, if the identity information is the owner for the target multimedia, the permission control is the granting permission control. The pushing, according to the identity information, a sharing notification including a permission control to a client of the at least one user may include: pushing a sharing notification including the granting permission control to the client of the second user corresponding to the owner.

Specifically, when the server pushes a sharing notification including a permission control to the client of at least one user according to the identity information, for a user whose identity information is the above non-owner, the user needs to apply for a permission for the target multimedia, and a sharing notification including the applying permission control can be pushed to a client of a first user of the non-owner, so that the first user can apply for the access permission for the target multimedia from the second user based on the applying permission control, thereby achieving access to the target multimedia; for a user whose identity information is the above owner, the user needs to grant a permission for the target multimedia, and a sharing notification including the granting permission control can be pushed to a client of a second user of the owner, so that the second user can grant the access permission for the target multimedia to the above first user based on the granting permission control, thereby achieving sharing of the target multimedia.

Exemplarily, FIG. 4 is a schematic diagram of a sharing notification provided in an embodiment of the present disclosure. As shown in FIG. 4, the figure takes the target process being a conference process as an example to show a sharing notification 400 including an applying permission control 401. The sharing notification 400 is pushed to the client of the first user of the non-owner for display. The applying permission control 401 has a prompt message of "applying for access permission". The first user can obtain the access permission for the target multimedia by triggering the applying permission control 401. The target multimedia is the recording file "Xiao A's Video Conference" in the figure. The sharing notification 400 may also include the subject "Xiao A's video conference" of the conference process, the owner "Xiao A", the conference time "20-—**18:32:19" and other information to remind the first user of the non-owner more relevant information of the target process and the target multimedia.

In the multimedia sharing solution provided in the embodiments of the present disclosure, a server receives a recording end instruction for a target multimedia, the target multimedia being used to record a target process; determines identity information of at least one user who participates in the target process; and pushes, according to the identity information, a sharing notification including a permission control to a client of the at least one user, so that the at least one user grants or applies for access permission for the target multimedia based on the permission control, where different identity information corresponds to different permission controls. By using the above technical solution, after receiving a recording end instruction of a multimedia, the server can push a sharing notification including different permission controls to each user according to identity information of each user who participates in the process, so that each user can grant or apply for access permission for the multimedia based on the permission controls. Accordingly, not only can an owner user of the multimedia conveniently share the multimedia, but other users can also quickly apply for access permission for the multimedia based on the permission controls even if the owner user of the multimedia does not actively share the multimedia, thereby reducing the difficulty in multimedia sharing, and improving the efficiency of multimedia sharing.

In some embodiments, after pushing a sharing notification including the applying permission control to a client of a first user corresponding to the non-owner, the multimedia sharing method may also include: acquiring an applying permission request sent by the client of the first user in response to a trigger operation of the first user on the applying permission control; sending the applying permission request to a client of a second user corresponding to the owner of the target multimedia, so that the client of the second user sets access permission of the first user for the target multimedia; and sending a permission confirmation notification to the client of the first user.

The server of an embodiment of the present disclosure may include an instant messaging server and a file server.

After receiving the sharing notification including the applying permission control that is sent by the server, the client of the first user can display the sharing notification to the first user, and then send an applying permission request to the server in response to a trigger operation of the first user on the applying permission control. Since the target multimedia is stored in a cloud space of the second user of the owner, the access permission for the target multimedia is managed by a file server. The instant messaging server in the server acquires the applying permission request, and can apply for permissions from the file server based on the applying permission request. The file server sets access permission of the first user for the target multimedia based on the operation of the second user on its client, and then can feedback a permission confirmation notification to the client of the above first user.

In the above solution, even if an owner user of a multimedia does not actively share the multimedia, a non-owner user can also actively and quickly obtain the access permission for the target multimedia based on the applying permission control in the sharing notification, preventing the non-owner user from searching in various ways to obtain the access permission for the multimedia, thereby quickly realizing the sharing of multimedia.

In some embodiments, after pushing a sharing notification including the granting permission control to the client of the second user corresponding to the owner, the multimedia sharing method may also include: acquiring a permission granting instruction sent by the client of the second user, the permission granting instruction being sent in response to a trigger operation of the second user on the granting permission control and used to set access permission of the first user among the at least one user except the second user for the target multimedia; and sending the permission granting notification to the client of the first user, and displaying the permission granting notification.

After receiving the sharing notification including the granting permission control that is sent by the server, the client of the second user can display the sharing notification to the second user, and then in response to the trigger operation of the second user on the granting permission control, send a permission granting instruction to the server. The instant messaging server in the server can send a permission authorization request to the file server based on the permission granting instruction, and the file server can set access permission of the first user for the target multimedia, send a permission granting notification to the client of the first user, and display the permission granting notification.

Optionally, since the access permission of the target multimedia may include at least one of an editing permission, a browsing permission, a sharing permission, etc., when setting access permission of the first user for the target multimedia, different first user is supported to be set with different access permission when there is a plurality of first users. For example, the editing permission thereof for the target multimedia can be set for a user A, and the sharing permission thereof for the target multimedia can be set for a user B.

It can be understood that after receiving the trigger operation of the second user on the granting permission control, the client of the second user can also close the granting permission control and display a withdrawal control, and the withdrawal control can also include a prompt massage representing that the target multimedia has been shared with all participants in the target process. Thereafter, in response to the trigger operation of the second user on the withdrawal control, the client of the second user can withdraw the setting of the access permission, that is, after the authorization of the access permission of the first user for the target multimedia is successfully cancelled. Optionally, the setting of withdrawing the access permission is only for the browsing permission and the sharing permission in the access permissions, and the withdrawal is not supported for the first user who has obtained the editing permission.

In the above solution, for the user of the owner, the access permission for the target multimedia can be quickly granted based on the sharing notification including the granting permission control, thereby quickly achieving the sharing of multimedia.

In some embodiments, the sharing notification also includes link information of the target multimedia, and the client of at least one user accesses the target multimedia through the link information of the target multimedia.

The link information of the target multimedia may be text information bound to a uniform resource locator (URL) of the target multimedia. For example, referring to FIG. 4, "Xiao A's video conference" after the recording file is the link information of the target multimedia. After obtaining the access permission for the target multimedia, each user who participates in the target process can trigger the link information of the target multimedia, so that the corresponding client can acquire the target multimedia based on the link information of the target multimedia, and display same.

In the above solution, by setting the link information of the target multimedia in the sharing notification, the user can quickly access the target multimedia based on the link information, improving the access efficiency of the target multimedia.

FIG. 5 is a flow diagram of yet another multimedia sharing method provided in an embodiment of the present disclosure. The method may be executed by a multimedia sharing apparatus, where the apparatus may be implemented using software and/or hardware and may generally be integrated into an electronic device. As shown in FIG. 5, the method is applied to a client of a first user, and includes:

Step 501, display a sharing notification, the sharing notification including an applying permission control for a target multimedia, the first user being a user of a non-owner of the target multimedia, and the sharing notification being pushed by a server according to identity information of the first user.

The first user may include all users of the non-owner of the target multimedia, or may only include preset users among the users of the non-owner. The preset users can be set according to actual service scenarios. In an embodiment of the present disclosure, the preset users may include a recording initiating user of the target multimedia, as well as a process organizing user and a process initiating user of the target process corresponding to the target multimedia.

Specifically, the client of the first user may receive a sharing notification including an applying permission control that is sent by the server, and the sharing notification is automatically pushed by the server after determining the identity information of the first user.

Step 502, send, in response to a trigger operation on the applying permission control, an applying permission request to the server so that the server sends the applying permission request to a client of a second user of an owner of the target multimedia, and set access permission of the first user for the target multimedia.

After receiving the sharing notification including the applying permission control that is sent by the server, the client of the first user can display the sharing notification to the first user, and then in response to the trigger operation of the first user on the applying permission control, send an applying permission request to the server. Since the target multimedia is stored in a cloud space of the second user of the owner, the access permission for the target multimedia is managed by a file server. The instant messaging server in the server acquires the applying permission request, and can apply for permissions from the file server based on the applying permission request. The file server sets access permission of the first user for the target multimedia based on the operation of the second user on its client, and then can feedback a permission confirmation notification to the client of the above first user.

Step 503, adjust a display style of the applying permission control.

After sending the applying permission request to the server, the client of the first user can adjust the display style of the applying permission control from the initial style to a target style. The target style can be a style representing that the current user has applied for the access permission for the target multimedia, which can be specifically set according to the actual situation. For example, the target style can be a prompt text representing that the current user has applied for the access permission for the target multimedia.

Exemplarily, referring to FIG. 4, after the first user clicks on the applying permission control 401, the applying permission control 401 can be adjusted from the current style to a prompt text representing that the current user has applied for the access permission for the target multimedia. The prompt text can be set according to the actual situation. For example, the prompt text can be "access permission for the recording file have been applied for", which is only an example.

In some embodiments, the multimedia sharing method may also include: acquiring a permission confirmation notification, and displaying first notification information, the first notification information representing notification information that the first user has obtained the access permission for the target multimedia.

After the client of the first user acquires the permission confirmation notification sent by the server, it is indicated that the access permission is successfully obtained, and the first notification information representing that the first user has obtained the access permission for the target multimedia can be displayed. The specific format of the first notification information is not limited, and, for example, can be a prompt text or a picture, etc.

Exemplarily, FIG. 6 is a schematic diagram of first notification information provided in an embodiment of the present disclosure. As shown in FIG. 6, a piece of exemplary first notification information 600 is shown in the figure. The first notification information corresponds to the sharing notification in FIG. 4. The first notification information 600 includes a prompt text "@Xiao A has granted access permission for a recording file, i.e., Xiao A's video conference for you", indicating that the current first user has obtained the access permission for "a recording file, i.e., Xiao A's video conference" of the conference process in FIG. 4. The above first notification information is only an example and not a limitation.

In the above solution, by displaying relevant notification information after confirming the authorization, the user can quickly learn that a certain multimedia can be accessed, and then access the multimedia.

In some embodiments, the multimedia sharing method may also includes: acquiring an existing permission notification, and displaying second notification information, the second notification information representing notification information that the first user already has the access permission for the target multimedia.

After the client of the first user sends the applying permission request to the server, if the server determines that the current first user already has the access permission for the target multimedia, it is indicated that the second user of the owner of the target multimedia has already been granted with permissions before the first user applies for same, and the existing permission notification can be returned to the client of the first user. After receiving the existing permission notification, the client of the first user can display the second notification information representing that the first user already has the access permission for the target multimedia. The specific format of the second notification information is not limited, and, for example, can be a prompt text or a picture, etc. For example, the second notification information can include a prompt text "access permission for the recording file have already obtained", which is only an example.

In the above solution, when the current user already has a certain multimedia permission and applies for permissions, relevant notification information can be displayed, so that the user can quickly learn about his/her own permission status for the multimedia.

In some embodiments, the sharing notification also includes link information of the target multimedia. After acquiring the permission confirmation notification, the multimedia sharing method may also include: acquiring, in response to a trigger operation on the link information of the target multimedia, the target multimedia based on the link information of the target multimedia, and displaying same.

The link information of the target multimedia may be text information bound to a uniform resource locator (URL) of the target multimedia. For example, referring to FIG. 4 or FIG. 6, "Xiao A's video conference" is the link information of the target multimedia. After the client where the first user of the non-owner acquires the permission confirmation notification, it is indicated that the first user has already obtained the access permission for the target multimedia. Thereafter, the first user can trigger the link information of the target multimedia. The client of the first user acquires, in response to the trigger operation, the target multimedia based on the link information of the target multimedia, and displays the same.

In the above solution, by setting the link information of the target multimedia in the sharing notification, the user can quickly access the target multimedia based on the link information, improving the access efficiency of the target multimedia.

In the multimedia sharing solution provided in an embodiment of the present disclosure, a sharing notification is displayed, the sharing notification including an applying permission control for a target multimedia, the first user being a user of a non-owner of the target multimedia, and the sharing notification being pushed by a server according to identity information of the first user; in response to a trigger operation on the applying permission control, an applying permission request is sent to the server, so that the server sends the applying permission request to a client of a second user of an owner of the target multimedia, and access permission of the first user for the target multimedia is set; and a display style of the applying permission control is adjusted. By using the above technical solution, after the server pushes, according to the identity information of the first user who participates in the process, the sharing notification including the applying permission control to the client of the non-owner user of the multimedia, the non-owner user can apply for access permission for the multimedia based on the applying permission control. Even if the owner user of the multimedia does not actively share the multimedia, the non-owner user can also quickly share same based on the permission control, reducing the difficulty of multimedia sharing and improving the efficiency of multimedia sharing.

Figure 7:
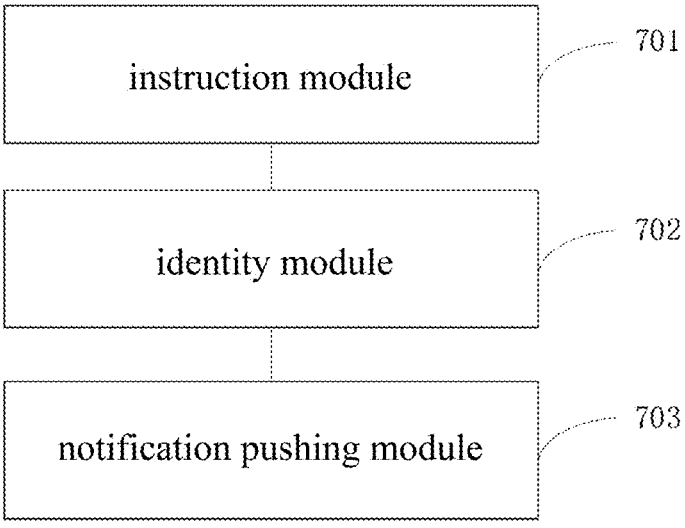
FIG. 7 is a schematic structural diagram of a multimedia sharing apparatus provided in an embodiment of the present disclosure.

FIG. 7 is a schematic structural diagram of a multimedia sharing apparatus provided in an embodiment of the present disclosure. The apparatus may be implemented by software and/or hardware and may generally be integrated into an electronic device. As shown in FIG. 7, the apparatus is provided on a server end and includes:

an instruction module 701, used for receiving a recording end instruction for a target multimedia, the target multimedia being used to record a target process;

an identity module 702, used for determining identity information of at least one user who participates in the target process; and a notification pushing module 703, used for pushing, according to the identity information, a sharing notification including a permission control to a client of the at least one user, so that the at least one user grants or applies for access permission for the target multimedia based on the permission control, where different identity information corresponds to different permission controls.

Optionally, the identity module 702 includes:

an acquisition unit, used for acquiring schedule information of the target process; and a determination unit, used for determining identity information of the at least one user according to the schedule information.

Optionally, the identity information includes an owner and a non-owner for the target multimedia. The determination unit is used for:

determining a process organizing user and a process initiating user of the target process, as well as a recording initiating user of the target multimedia according to the schedule information;

determining the identity information of a target user among the process organizing user, the process initiating user and the recording initiating user as the owner according to a preset priority strategy; and determining the identity information of other users among the at least one user except the target user as the non-owner.

Optionally, the permission control includes a granting permission control and an applying permission control.

Optionally, if the identity information is the non-owner for the target multimedia, the permission control is the applying permission control. The notification pushing module 703 is used for:

pushing a sharing notification including the applying permission control to a client of a first user corresponding to the non-owner.

Optionally, the apparatus also includes an application module, used for:

acquiring an applying permission request sent by the client of the first user in response to a trigger operation of the first user on the applying permission control;

sending the applying permission request to a client of a second user corresponding to the owner of the target multimedia, so that the client of the second user sets access permission of the first user for the target multimedia; and sending a permission confirmation notification to the client of the first user.

Optionally, if the identity information is the owner for the target multimedia, the permission control is the granting permission control. The notification pushing module 703 is used for:

pushing a sharing notification including the granting permission control to the client of the second user corresponding to the owner.

Optionally, the apparatus also includes an authorization module, used for:

acquiring a permission granting instruction sent by the client of the second user, the permission granting instruction being sent in response to a trigger operation of the second user on the granting permission control and used to set access permission of the first user among the at least one user except the second user for the target multimedia; and sending the permission granting notification to the clients of the other users, and displaying the permission granting notification.

Optionally, the access permission includes at least one of an editing permission, a browsing permission, and a sharing permission, and different first user is supported to be set with different access permission.

Optionally, the sharing notification also includes link information of the target multimedia, and the client of the at least one user accesses the target multimedia through the link information of the target multimedia.

The multimedia sharing apparatus provided in an embodiment of the present disclosure can execute the multimedia sharing method provided in any embodiment of the present disclosure, and has the corresponding functional modules and beneficial effects of executing the method.

Figure 8:
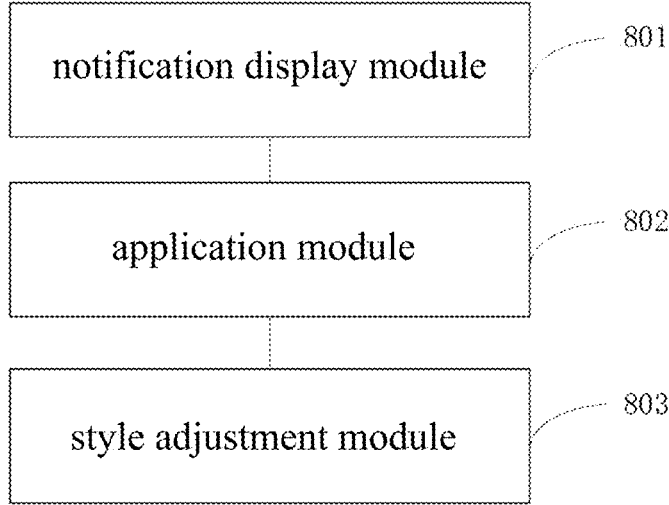
FIG. 8 is a schematic structural diagram of another multimedia sharing apparatus provided in an embodiment of the present disclosure.

FIG. 8 is a schematic structural diagram of another multimedia sharing apparatus provided in an embodiment of the present disclosure. The apparatus may be implemented by software and/or hardware and may generally be integrated into an electronic device. As shown in FIG. 8, the apparatus is provided on a client of a first user, and includes:

a notification display module 801, used for displaying a sharing notification, the sharing notification including an applying permission control for a target multimedia, the first user being a user of a non-owner of the target multimedia, and the sharing notification being pushed by a server according to identity information of the first user;

an application module 802, used for sending, in response to a trigger operation on the applying permission control, an applying permission request to the server so that the server sends the applying permission request to a client of a second user of an owner of the target multimedia, and setting access permission of the first user for the target multimedia; and a style adjustment module 803, used for adjusting a display style of the applying permission control.

Optionally, the apparatus also includes a first notification module, used for:

acquiring a permission confirmation notification, and displaying first notification information, the first notification information representing notification information that the first user has obtained the access permission for the target multimedia.

Optionally, the apparatus also includes a second notification module, used for:

acquiring an existing permission notification, and displaying second notification information, the second notification information representing notification information that the first user already has the access permission for the target multimedia.

Optionally, the first user is a preset user among the users of the non-owner, and the preset user includes a recording initiating user of the target multimedia, as well as a process organizing user and a process initiating user of a target process corresponding to the target multimedia.

Optionally, the sharing notification also includes link information of the target multimedia. After acquiring the permission confirmation notification, the apparatus also includes a display module, used for:

acquiring, in response to a trigger operation on the link information of the target multimedia, the target multimedia based on the link information of the target multimedia, and displaying same.

The multimedia sharing apparatus provided in an embodiment of the present disclosure can execute the multimedia sharing method provided in any embodiment of the present disclosure, and has the corresponding functional modules and beneficial effects of executing the method.

An embodiment of the present disclosure also provides a computer program product, including a computer program/ instruction, which, when executed by a processor, implements the multimedia sharing method provided in any embodiment of the present disclosure.

Figure 9:
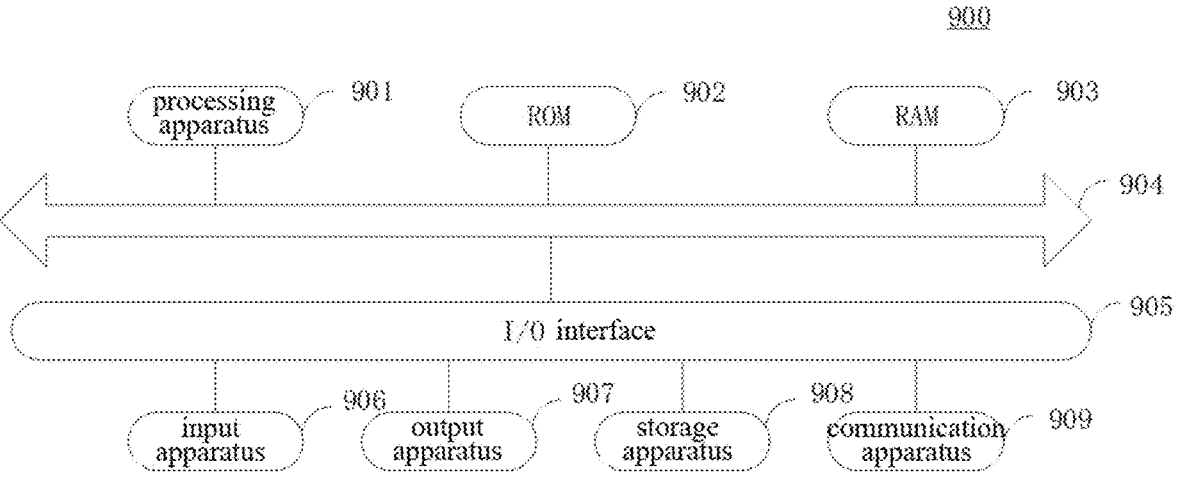
FIG. 9 is a schematic structural diagram of an electronic device provided in an embodiment of the present disclosure.

FIG. 9 is a schematic structural diagram of an electronic device provided in an embodiment of the present disclosure. Specific reference is made below to FIG. 9, which shows a schematic structural diagram suitable for use in implementing an electronic device 900 in an embodiment of the present disclosure. The electronic device 900 in an embodiment of the present disclosure may include, but is not limited to, mobile terminals such as a mobile phone, a laptop computer, a digital broadcast receiver, a PDA (personal digital assistant), a PAD (tablet computer), a PMP (portable multimedia player) and a vehicle-mounted terminal (such as a vehicle-mounted navigation terminal), and fixed terminals such as a digital TV and a desktop computer. The electronic device shown in FIG. 9 is merely an example and should not limit the functions and scope of use of the embodiments of the present disclosure.

As shown in FIG. 9, the electronic device 900 may include a processing apparatus (such as a central processing unit and a graphics processor) 901, which can perform various appropriate actions and processes according to a program stored in a read-only memory (ROM) 902 or a program loaded from a storage apparatus 908 to a random access memory (RAM) 903. In the RAM 903, various programs and data necessary for the operation of the electronic device 900 are also stored. The processing apparatus 901, ROM 902 and RAM 903 are connected to one another via a bus 904. An input/output (I/O) interface 905 is also connected to the bus 904.

Typically, the following apparatuses can be connected to the I/O interface 905: an input apparatus 906 including, for example, a touch screen, a touchpad, a keyboard, a mouse, a camera, a microphone, an accelerometer, a gyroscope, etc.; an output apparatus 907 including, for example, a liquid crystal display (LCD), a speaker, a vibrator, etc.; a storage apparatus 908 including, for example, a magnetic tape, a hard disk, etc.; and a communication apparatus 909. The communication apparatus 909 may allow the electronic device 900 to communicate with other devices wirelessly or by wire to exchange data. Although FIG. 9 shows the electronic device 900 having various apparatuses, it should be understood that it is not required to implement or possess all of the apparatuses shown. More or fewer apparatuses may alternatively be implemented or provided.

In particular, according to the embodiments of the present disclosure, the processes described above with reference to the flowcharts may be implemented as a computer software program. For example, an embodiment of the present disclosure includes a computer program product, which includes a computer program carried on a non-transitory computer-readable medium, and the computer program contains program code for executing the method shown in the flowcharts. In such an embodiment, the computer program can be downloaded and installed from a network via the communication apparatus 909, or installed from the storage apparatus 908, or installed from the ROM 902. When the computer program is executed by the processing apparatus 901, the above functions defined in the multimedia sharing method of an embodiment of the present disclosure are executed.

It should be noted that the computer-readable medium mentioned above in the present disclosure may be a computer-readable signal medium or a computer-readable storage medium or any combination of the above two. A computer readable storage medium may be, for example but not limited to, an electronic, magnetic, optical, electromagnetic, infrared, or semiconductor system, apparatus, or device, or any combination of the foregoing. More specific examples of computer-readable storage media may include, but are not limited to, an electrical connection having one or more conductors, a portable computer disk, a hard disk, a random access memory (RAM), a read-only memory (ROM), an erasable programmable read-only memory (EPROM or flash memory), optical fibers, a portable compact disk-read-only memory (CD-ROM), an optical storage device, a magnetic storage device, or any suitable combination of the foregoing. In the present disclosure, the computer readable storage medium may be any tangible medium that contains or stores a program for use by or in connection with an instruction execution system, apparatus, or device. In the present disclosure, the computer-readable signal medium may include a data signal propagated in a baseband or as a part of a carrier wave, in which the computer-readable program code is carried. Such a propagated data signal may take a variety of forms, including but not limited to electromagnetic signals, optical signals, or any suitable combination of the foregoing. A computer-readable signal medium may also be any computer-readable medium other than the computer-readable storage medium and can send, propagate, or transport a program for use by or in connection with an instruction execution system, apparatus, or device. The program code embodied on the computer readable medium may be transmitted using any appropriate medium, including but not limited to: wires, optical cables, RF (radio frequency), etc., or any suitable combination of the foregoing.

In some embodiments, the client and server can communicate using any currently known or future developed network protocol such as an HTTP (HyperText Transfer Protocol), and can be interconnected with any form or medium of digital data communication (e.g., a communication network). Examples of communication networks include a local area network ("LAN"), a wide area network ("WAN"), an internetwork (e.g., the Internet), and a peer-to-peer network (e.g., an ad hoc peer-to-peer network), as well as any currently known or future developed network.

The above computer-readable medium may be included in the above electronic device, or may exist independently without being incorporated into the electronic device.

The above computer-readable medium carries one or more programs. When the above one or more programs are executed by the electronic device, the electronic device: receives a recording end instruction for a target multimedia, the target multimedia being used to record a target process; determines identity information of at least one user who participates in the target process; and pushes, according to the identity information, a sharing notification including a permission control to a client of the at least one user, so that the at least one user grants or applies for access permission for the target multimedia based on the permission control, where different identity information corresponds to different permission controls.

Alternatively, the above computer-readable medium carries one or more programs. When the above one or more programs are executed by the electronic device, the electronic device: displays a sharing notification, the sharing notification including an applying permission control for a target multimedia, the first user being a user of a non-owner of the target multimedia, and the sharing notification being pushed by a server according to identity information of the first user; sends, in response to a trigger operation on the applying permission control, an applying permission request to the server so that the server sends the applying permission request to a client of a second user of an owner of the target multimedia, and sets access permission of the first user for the target multimedia; and adjusts a display style of the applying permission control.

Computer program code for performing operations of the present disclosure may be written in one or more programming languages, or a combination thereof, including but not limited to object-oriented programming languages such as Java, Smalltalk, C++, and conventional procedural programming languages such as "C" or similar programming languages. The program code can be executed entirely on the user's computer, partly on the user's computer, as a stand-alone software package, partly on the user's computer and partly on a remote computer, or entirely on the remote computer or a server. In cases involving a remote computer, the remote computer can be connected to the user's computer through any type of network, including a local area network (LAN) or a wide area network (WAN), or may be connected to an external computer (e.g., through the Internet using an Internet service provider).

The flowcharts and block diagrams in the accompanying drawings illustrate possibly implemented architectures, functions, and operations of systems, methods, and computer program products according to various embodiments of the present disclosure. In this regard, each block in the flowcharts or block diagrams may represent a module, a program segment, or a portion of code, which contains one or more executable instructions for implementing the specified logical functions. It should also be noted that, in some alternative implementations, the functions noted in the blocks may also occur out of the order noted in the accompanying drawings. For example, two blocks shown in succession may actually be executed substantially in parallel, or may sometimes be executed in the reverse order, depending on the functionality involved. It should also be noted that each block in the block diagrams and/or flowcharts and combinations of blocks in the block diagrams and/or flowcharts can be implemented by a dedicated hardware-based system that performs the specified functions or operations, or can be implemented by a combination of dedicated hardware and computer instructions.

The units involved in the embodiments described in the present disclosure may be implemented by software or by hardware. In some cases, the name of a unit does not constitute a limitation on the unit itself.

The functions described above herein may be performed at least in part by one or more hardware logic components. For example, and without limitation, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, the machine-readable medium may be a tangible medium that can contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media would include an electrical connection based on one or more wires, a portable computer disk, a hard disk, a random access memory (RAM), a read-only memory (ROM), an erasable programmable read-only memory (EPROM or flash memory), optical fibers, a portable compact disk-read-only memory (CD-ROM), an optical storage device, a magnetic storage device, or any suitable combination of the foregoing.

The above description is only a preferred embodiment of the present disclosure and an illustration of the technical principles used. Those skilled in the art should understand that the scope of disclosure involved in the present disclosure is not limited to the technical solutions formed by a specific combination of the above technical features, but should also cover other technical solutions formed by any combination of the above technical features or their equivalent features without departing from the above concepts of the disclosure. For example, the above features are replaced with the technical features with similar functions disclosed (but not limited to) in the present disclosure to form a technical solution.

Further, while various operations are depicted in a particular order, this should not be understood as requiring that such operations be performed in the particular order shown or in a sequential order. Under certain circumstances, multitasking and parallel processing may be advantageous. Likewise, while the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in a plurality of embodiments separately or in any suitable sub-combination.

Although the subject matter has been described in language specific to structural features and/or methodological acts, it should be understood that the subject matter defined in the appended claims is not necessarily limited to the specific features or acts described above. Rather, the specific features and acts described above are merely example forms of implementing the claims.

What is claimed is:

1. A multimedia sharing method, being applied to a server and comprising:

receiving a recording end instruction for a target multimedia, the target multimedia being configured to record a target process;

determining identity information of at least two users who participate in the target process; and pushing, according to the identity information, a sharing notification comprising a permission control to a client of the at least two users, so that a portion of the at least two users applies for access permission for the target multimedia based on the permission control, and another portion of the at least two users grants the access permission for the target multimedia to the portion of the at least two users based on the permission control, wherein sharing notifications comprising different permission controls are pushed to users with different identity information.

2. The method according to claim 1, wherein the determining identity information of the at least two users who participate in the target process comprises:

acquiring schedule information of the target process; and determining identity information of the at least two users according to the schedule information.

3. The method according to claim 2, wherein the identity information comprises an owner and a non-owner of the target multimedia, and the determining identity information of the at least two users according to the schedule information comprises:

determining a process organizing user and a process initiating user of the target process, as well as a recording initiating user of the target multimedia according to the schedule information;

determining the identity information of a target user among the process organizing user, the process initiating user and the recording initiating user as the owner according to a preset priority strategy; and determining the identity information of other users among the at least two users except the target user as the non-owner.

4. The method according to claim 1, wherein the permission control comprises a granting permission control and an applying permission control.

5. The method according to claim 3, wherein in response to the identity information being the non-owner of the target multimedia, the permission control is an applying permission control; and the pushing, according to the identity information, a sharing notification comprising a permission control to a client of the at least two users comprises:

pushing a sharing notification comprising the applying permission control to a client of a first user corresponding to the non-owner.

6. The method according to claim 5, wherein the method further comprises:

acquiring an applying permission request sent by the client of the first user, in response to a trigger operation of the first user on the applying permission control;

sending the applying permission request to a client of a second user corresponding to the owner of the target multimedia, so that the client of the second user sets access permission of the first user for the target multimedia; and sending a permission confirmation notification to the client of the first user.

7. The method according to claim 3, wherein in response to the identity information being the owner of the target multimedia, the permission control is a granting permission control; and the pushing, according to the identity information, a sharing notification comprising a permission control to a client of the at least two users comprises:

pushing a sharing notification comprising the granting permission control to a client of a second user corresponding to the owner.

8. The method according to claim 7, wherein the method further comprises:

acquiring a permission granting instruction sent by the client of the second user, the permission granting instruction being sent in response to a trigger operation of the second user on the granting permission control and configured to set access permission of all first user for the target multimedia; and sending a permission granting notification to the client of the first user, and displaying the permission granting notification.

9. The method according to claim 8, wherein the access permission comprises at least one of an editing permission, a browsing permission, or a sharing permission, and different first user is supported to be set with different access permission.

10. The method according to claim 1, wherein the sharing notification further comprises link information of the target multimedia, and the client of the at least two users accesses the target multimedia through the link information of the target multimedia.

11. An electronic device, comprising:

a processor; and a memory configured to store instructions executable by the processor;

the processor being configured to read the executable instructions from the memory and executing the instructions to implement the following operations which are applied to a server:

receiving a recording end instruction for a target multimedia, the target multimedia being configured to record a target process;

determining identity information of at least two users who participate in the target process; and pushing, according to the identity information, a sharing notification comprising a permission control to a client of the at least two users, so that a portion of the at least two users applies for access permission for the target multimedia based on the permission control, and another portion of the at least two users grants the access permission for the target multimedia to the portion of the at least two users based on the permission control, wherein sharing notifications comprising different permission controls are pushed to users with different identity information.

12. The electronic device according to claim 11, wherein the determining identity information of the at least two users who participate in the target process comprises:

acquiring schedule information of the target process; and determining identity information of the at least two users according to the schedule information.

13. A non-transitory computer-readable storage medium, wherein the storage medium stores a computer program, which is configured to execute the multimedia sharing method as claimed in claim 1.

* * * * *